(12) United States Patent
Fujimoto (10) Patent No.: US 10,181,240 B2
(45) Date of Patent: Jan. 15, 2019

(54) INFORMATION READING APPARATUS (71) Applicant: DENSO WAVE INCORPORATED, Chita-gun, Aichi-pref. (JP)

(72) Inventor: Takahiro Fujimoto, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 15/470,348

(22) Filed: Mar. 27, 2017

(65) Prior Publication Data

US 2017/0278361 A1 Sep. 28, 2017

(30) Foreign Application Priority Data

Mar. 28, 2016 (JP) .................................. 2016-063427

(51) Int. Cl.
*G06K 19/00* (2006.01)
*G07G 1/00* (2006.01)
*G07G 1/01* (2006.01)
*G07G 1/12* (2006.01)
*G06K 7/00* (2006.01)
*G06K 7/10* (2006.01)

(52) U.S. Cl.
CPC ......... *G07G 1/0045* (2013.01); *G06K 7/0008* (2013.01); *G06K 7/10336* (2013.01); *G07G 1/0018* (2013.01); *G07G 1/0081* (2013.01); *G07G 1/01* (2013.01); *G07G 1/12* (2013.01); *G07G 1/009* (2013.01)

(58) Field of Classification Search
USPC .......... 235/435, 439, 451, 487, 492; 340/10, 340/572
See application file for complete search history.

(56) References Cited

U.S. PATENT DOCUMENTS 5,640,002 A * 6/1997 Ruppert ............... G06K 7/0008
235/383
2005/0211771 A1 9/2005 Onozu
2014/0291404 A1 10/2014 Matsuoka et al.
2015/0161601 A1 6/2015 Matsumoto et al.
2016/0127600 A1 * 5/2016 Beatty .................... H04N 1/327
358/1.15

FOREIGN PATENT DOCUMENTS

JP 2007-047960 A 2/2007

* cited by examiner

*Primary Examiner* — Matthew Mikels
(74) *Attorney, Agent, or Firm* — Oliff PLC (57) ABSTRACT

An information reading apparatus is provided. The information reading apparatus enables stable contactless communication with a contactless communication medium even when the apparatus includes a display device for displaying information associated with reading results, in addition to an information reading device and a contactless communication device. The information stored in the contactless communication medium held over a reading surface is read by the contactless communication device according to transmission/reception of electromagnetic waves via an antenna. The reading surface includes a reading port on the inside of the antenna in plan view of the reading surface, and includes a mark arranged not to overlap the antenna.

22 Claims, 10 Drawing Sheets

INFORMATION READING APPARATUS

CROSS-REFERENCE TO RELATED APPLICATION

This application is based on and claims the benefit of priority from earlier Japanese Patent Application No. 2016-63427 filed Mar. 28, 2016, the description of which is incorporated herein by reference.

BACKGROUND OF THE INVENTION

Technical Field of the Invention

The present invention relates to an information reading apparatus that includes an information reading means for optically reading information, and contactless communication means for reading information stored in a contactless communication medium through contactless communication.

Related Art

In a POS (point-of-sales) system based on conventional art, a barcode affixed to a commodity product is optically read to acquire information on the commodity product. Due to the widespread use of cellular phones or smartphones, various services are widely available now, including discount services using an information code downloaded from a website or delivered through electronic mails, and payment services using an IC card. When receiving such services, a terminal for reading the information code or a terminal for reading the IC card is connected to the terminal of a POS register. The configuration of using such terminals having respective functions, however, raises problems such as of cost increase in the initial investment for introducing these terminals in addition to the POS system, or of securing the place of installation of the terminals. Such problems arise not only in the POS system but also in any system that involves reading of an information code or an IC card.

To solve these problems, it is necessary to use an information reading apparatus having both an information reading means for optically reading an information code, and a contactless communication means for reading the information stored in a contactless communication medium, such as an IC card, through contactless communication (radio communication). A patent document JP 2007-047960, for example, discloses a medium processing apparatus which is known as the information reading apparatus having the functions mentioned above.

This medium processing apparatus serves as an apparatus for reading information from a transportation ticket that is a magnetic ticket, a contactless ticket that is an IC card, and a barcode ticket that displays a barcode, and thus includes an antenna (contactless communication means) for communicating with the contactless ticket, and a barcode reader (information reading means) for optically reading a barcode. When the magnetic ticket is inserted into the slot, processing via the antenna and the barcode reader is inhibited to avoid conflict, i.e. crosstalk, with other media (the contactless ticket or the barcode ticket).

When a contactless ticket is held over the antenna, the shutter provided to the slot is closed to inhibit insertion of a magnetic ticket, while processing via the barcode reader is inhibited to thereby avoid crosstalk with other media (the magnetic ticket and the barcode ticket). When the barcode is read from a barcode ticket, the shutter provided to the slot is closed to inhibit processing of a magnetic ticket and processing via the antenna, to thereby avoid crosstalk with other media (the magnetic ticket and the contactless ticket).

When using various types of information codes, IC cards, or the like, a display means, such as a liquid crystal display, is required to be provided to notify various pieces of information resulting from reading. However, mere integration of the display means as mentioned above into a single terminal together with the information reading means and the contactless communication means may allow the display means to affect contactless communication performed by the contactless communication means. Depending on the communication conditions and the like, such integration may disable stable contactless communication with a contactless communication medium.

SUMMARY

Hence, it is desired to provide an information reading apparatus capable of stable contactless communication with a contactless communication medium even with a configuration in which an information reading means and a contactless communication means are integrated with a display means that displays read information.

To achieve the object set forth above, the subject matter of an exemplary embodiment relates to an information reading apparatus including: an information reading means for optically reading information imaged through a reading port; a contactless communication means for reading information stored in a contactless communication medium held over a reading surface, the information being read through contactless communication according to transmission/reception of electromagnetic waves via a loop antenna; and a display means for displaying information according to reading results of the information reading means and reading results of the contactless communication means. In the information reading apparatus, the reading port is arranged on the inside of the loop antenna in plan view of the reading surface, and the display means is arranged not to overlap the loop antenna in plan view of the reading surface.

According to the subject matter of this exemplary embodiment, the information stored in the contactless communication medium held over the reading surface is read by the contactless communication means according to transmission/reception of electromagnetic waves via the loop antenna. The reading port is arranged on the inside of the loop antenna in plan view of the reading surface, while the display means for displaying the information associated with the reading results is arranged so as not overlap the loop antenna.

Thus, the size of the loop antenna can be increased and, in addition, contactless communication of the contactless communication means is unlikely to be affected by the display means. Therefore, even when the information reading apparatus includes the display means for displaying the information associated with the reading results, in addition to the information reading means and the contactless communication means, stable contactless communication with the contactless communication medium is ensured. The loop antenna should include not only one provided with one or more annular loops, but also one having a shape of U, C, Ω, or the like.

According to the subject matter of another embodiment, the display means is arranged on the inside of the loop antenna in plan view of the reading surface. Accordingly, while the adverse effect of the display means on contactless communication is minimized, the size of the loop antenna can be further increased and thus communication performance associated with contactless communication is improved.

According to the subject matter of another embodiment, a holding member holds both of a control circuit board and an antenna board. The control circuit board mounts thereon a control circuit that performs at least part of control associated with the information reading means and the contactless communication means. The antenna circuit board is provided with an antenna pattern configuring the loop antenna.

According to the subject matter of another embodiment, the holding member is made of a material that contains a magnetic material. Therefore, magnetic permeability of the holding member is enhanced to easily collect the magnetic flux generated during contactless communication. As a result, magnetic flux emission efficiency is improved to thereby improve communication performance associated with contactless communication.

According to the subject matter of another embodiment, a magnetic member is arranged at least between the control circuit board and the holding member, or between the antenna circuit board and the holding member. Thus, the magnetic flux generated in the magnetic member during contactless communication is easily collected. As a result, magnetic flux emission efficiency is improved to thereby improve communication performance associated with contactless communication.

According to the subject matter of another embodiment, the magnetic member is formed into a sheet-like shape. The sheet-like magnetic member can be easily assembled to the holding member or the like to thereby improve workability associated with the assembly of the magnetic member.

According to the subject matter of another embodiment, the control circuit board is held by the holding member so as to be inclined with respect to the antenna circuit board. Thus, the projected area of the control circuit board on the antenna circuit board is made smaller than in the case where the control circuit board is held parallel to the antenna circuit board. Accordingly, the area serving as a passage of the magnetic flux generated in the loop antenna is reduced in the control circuit board. Thus, if the magnetic flux generated in the loop antenna during contactless communication affects the control circuit board, the adverse effect is minimized.

According to the subject matter of another embodiment, the reading surface is provided with a mark over which the contactless communication medium is held, the mark being positioned on the inside of the loop antenna in plan view of the reading surface. Thus, the contactless communication medium can be easily held at a position suitable for the loop antenna, thereby reliably ensuring contactless communication with the contactless communication medium.

According to the subject matter of another embodiment, the reading surface is provided with one or more light-emitting portions whose emission state change according to reading results of the information reading means and reading results of the contactless communication means. Accordingly, the reading results of these means are easily visually recognized.

According to the subject matter of another embodiment, at least part of the plurality of the light-emitting portions are arranged at diagonal corners of the reading surface. This arrangement of the light-emitting portions clarifies the location of the reading surface over which the contactless communication medium should be held. Therefore, the contactless communication medium can be easily held at a position suitable for the loop antenna to thereby ensure reliable contactless communication with the contactless communication medium.

DETAILED DESCRIPTION OF THE PREFERRED EMBODIMENTS

With reference to the accompanying drawings, preferred embodiments of the present application will now be detailed.

First Embodiment

Hereinafter, a first embodiment embodying an information reading apparatus of the present invention will be described with reference to the accompanying drawings.

FIGS. 1 to 4 show an information reading apparatus 10 which is configured as a stationary payment terminal that conducts payment processing using the information acquired as a result of optically reading information from an information code, such as a barcode and a QR code (registered trademark), or textual information, or the like.

Figure 1:
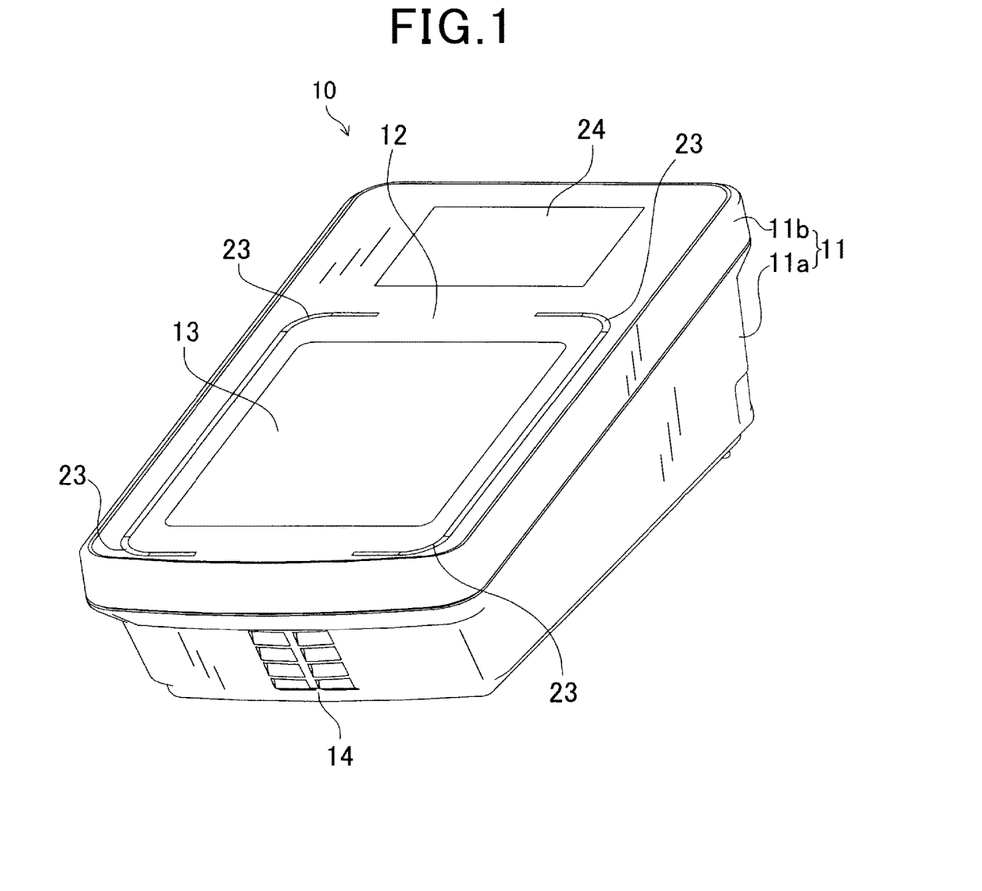
FIG. 1 is a perspective view illustrating an information reading apparatus, according to a first embodiment of the present invention.
Figure 2:
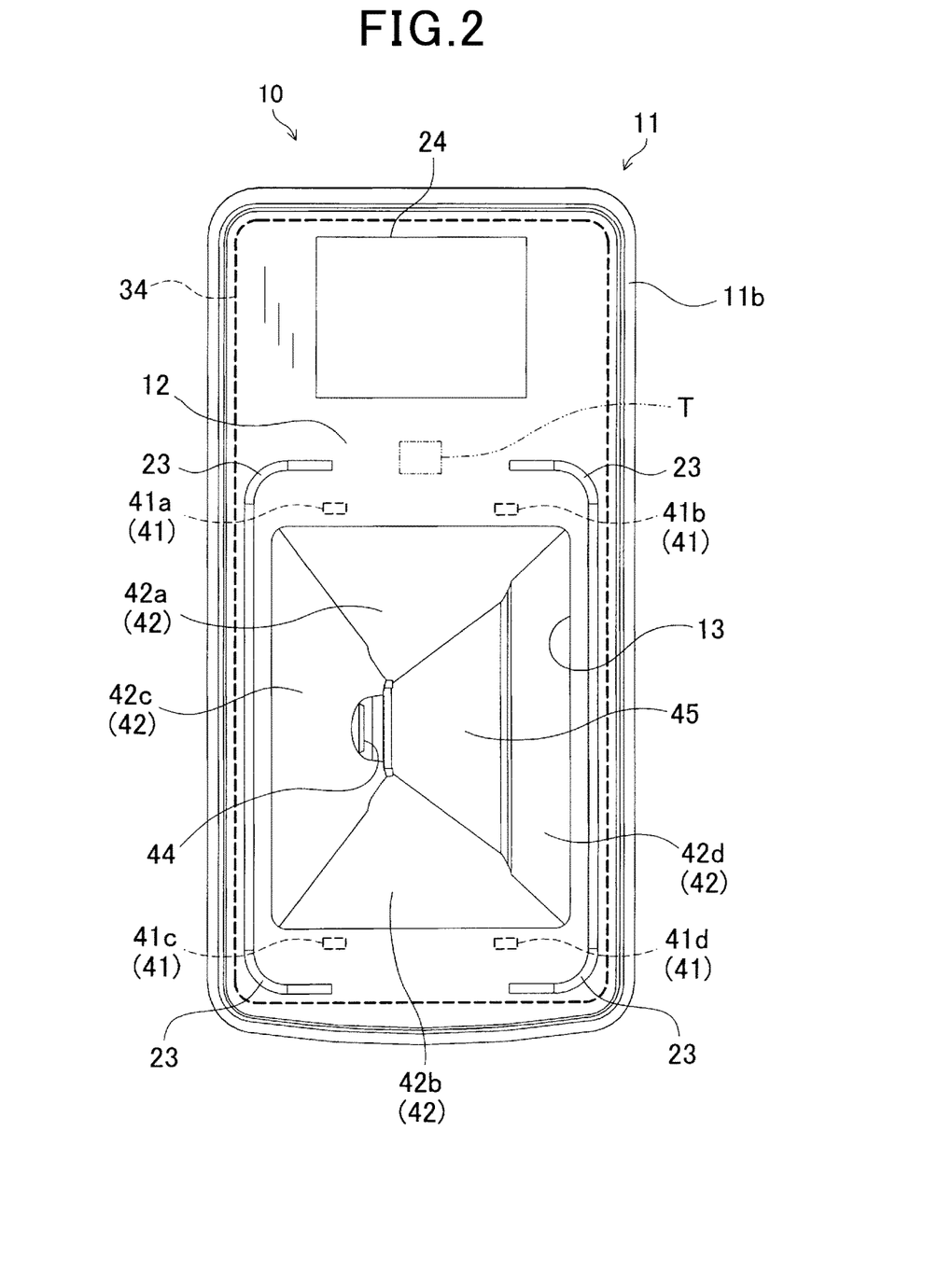
FIG. 2 is a plan view illustrating the information reading apparatus illustrated in FIG. 1.
Figure 3:
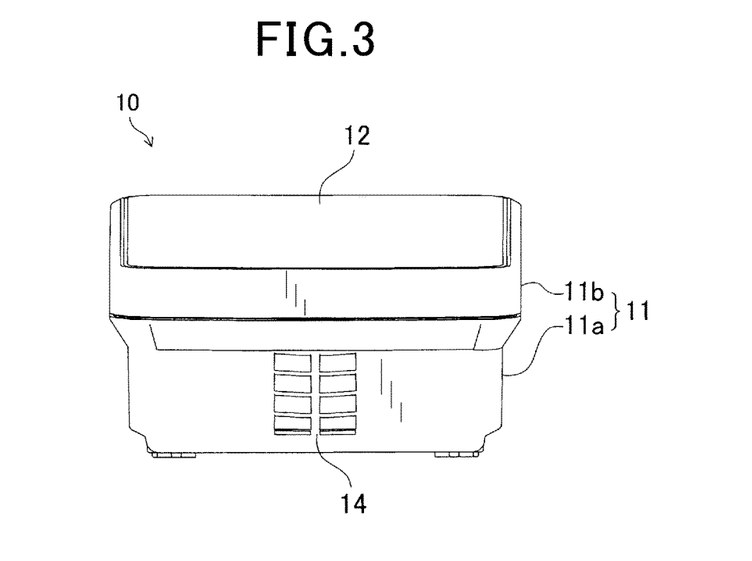
FIG. 3 is a front view illustrating the information reading apparatus illustrated in FIG. 1.

The information reading apparatus 10 is provided with a housing 11 that is an assembly of a lower casing 11a and an upper casing 11b. The lower casing 11a has a box-like shape and is made of a resin material, such as an ABS resin (acrylonitrile-butadiene-styrene resin). The upper casing 11b closes the upper face of the lower casing 11a. The housing 11 has an interior accommodating components, such as a control circuit board 50, an antenna circuit board 60, and a holding member 70 (see FIG. 7), described later. As shown in FIGS. 1 and 2, the housing 11 is provided with a reading port 13 serving as a light entry/exit port. The reading port 13 is arranged at a position corresponding to the front side (lower part of FIG. 2) of the upper face of the housing 11.

Light on the outside of the housing 11 is ensured to enter the housing 11 through the reading port 13, while light on the inside of the housing 11 is ensured to exit through the reading port 13. The upper face of the housing 11 is provided with LEDs (light emitting diodes) 23 which are arranged at four corners of the rectangular region surrounding the reading port 13.

The information reading apparatus 10 also includes a display 24 which is arranged at a position corresponding to the rear side (upper part of FIG. 2) of the upper face of the housing 11. The upper casing 11b is assembled to the lower casing 11a to cover the display 24, the reading port 13 and the LEDs 23. Therefore, the portions of the upper casing 11b covering the display 24, the reading port 13 and the LEDs 23 are made of a light transmissive material (e.g., transparent acrylic resin, transparent glass, etc.) that transmits light from the outside.

Figure 4:
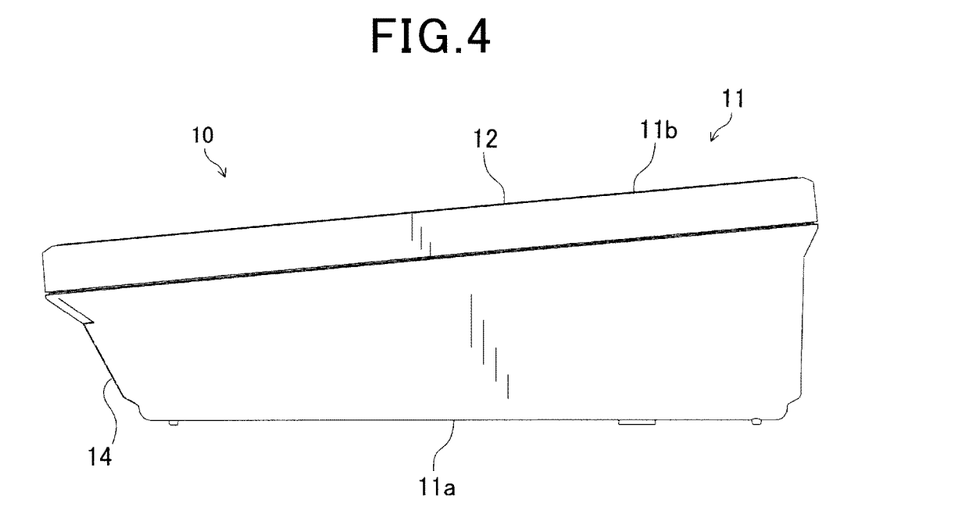
FIG. 4 is a side view illustrating the information reading apparatus illustrated in FIG. 1.

As shown in FIG. 4, the housing 11 is formed, with its upper face being inclined frontward relative to the mounting surface, so that the user on the front side can easily see the display 24, the reading port 13 and the like. The inclined upper face of the upper casing 11b is configured to serve as a reading surface 12 over which a contactless communication medium 100 is held. As shown in FIG. 2, the reading surface 12 includes a mark T near the center thereof to indicate a position over which the contactless communication medium 100 is held. In FIG. 2, the area of the mark T is enclosed by the dash-dot-dot line for the sake of convenience.

The following description addresses an electrical configuration of the information reading apparatus 10.

Figure 5A:
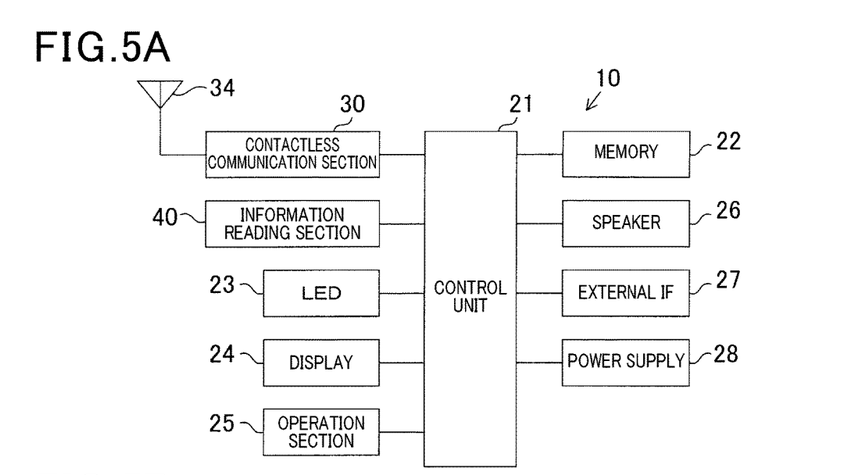
FIG. 5A is a block diagram illustrating an electrical configuration of the information reading apparatus illustrated in FIG. 1.

As shown in FIG. 5A, the information reading apparatus 10 includes a control unit 21 that controls the apparatus in its entirety. The control unit 21 is mainly configured by a microcomputer and thus includes a CPU (central processing unit), a system bus, and an input/output interface to configure an information processor together with a memory 22. At least part of the control circuit configuring the control unit 21, as well as other electronic components, is mounted to a control circuit board 50. For example, the memory 22 is loaded in advance with a predetermined program for executing a process of optically reading information from an information code, textual information, or the like, and a predetermined program for executing a reading process of communicating with a contactless communication medium, such as an IC card.

The four LEDs 23 and the display 24 mentioned above, as well as an operation section 25, a speaker 25, an external interface 27, and the like, are connected to the control unit 21. The LEDs 23 are ensured to be controlled by the control unit 21 to serve as light-emitting portions whose emission states change according to the results of reading of the contactless communication medium 100. For example, the emission states available by default include an emission state indicating successful optical reading of information, an emission state indicating unsuccessful optical reading of information, an emission state indicating successful reading of the contactless communication medium 100, an emission state indicating unsuccessful reading of the contactless communication medium 100, and the like. Being controlled and driven by the control unit 21, the LEDs 23 change the emission colors, emission intervals, and the like and are brought into individual emission states. The LEDs 23 are not necessarily all controlled by the control unit 21 to be a similar state, but may be controlled such that the mission states of some LEDs 23 are different from those of other LEDs 23, depending on the results of reading, and the like.

The display 24 is configured by a liquid crystal display or the like and ensured to serve as a display means for displaying information or the like associated with the results of optical reading or the results of reading of the contactless communication medium 100, under the control of the control unit 21. The operation section 25 is configured to provide an operation signal conforming to the operation to the control unit 21 which, receiving the operation signal, operates accordingly. The speaker 26 is controlled by the control unit 21 and arranged such that sound is emitted to the outside through a speaker port 14 formed on a front-side side face of the lower casing 11a.

The external interface 27 is configured as an interface to perform data communication with an external machine, such as a host computer, via a network or the like, and thus is configured to cooperate with the control unit 21 to perform communication processing. The information reading apparatus 10 also includes a power supply 28 which supplies electrical power to the control unit 21 and various electrical components.

The control unit 21 is also connected to a contactless communication section 30 and an information reading section 40.

Figure 5B:
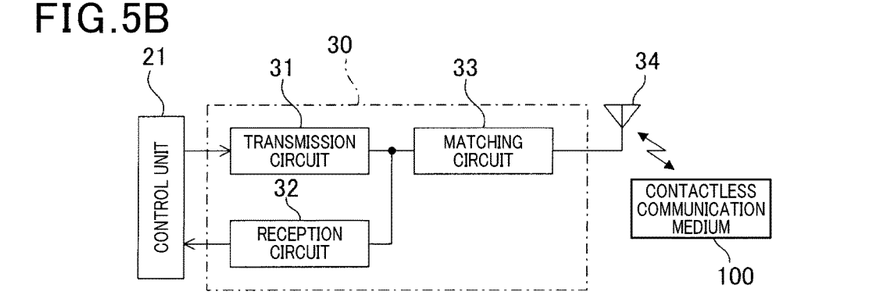
FIG. 5B is a schematic block diagram illustrating a contactless communication section illustrated in FIG. 5A.

The contactless communication section 30 is configured as a contactless communication means for communicating with the contactless communication medium 100 using electromagnetic waves, and for reading data stored in the contactless communication medium 100 or writing data into the contactless communication medium 100, in cooperation with an antenna 34 and the control unit 21. The contactless communication section 30 is configured as a circuit that transmits electromagnetic waves by a known method. As schematically shown in FIG. 5B, the contactless communication section 30 includes a transmission circuit 31, a reception circuit 32, and a matching circuit 33.

The transmission circuit 31 includes a carrier oscillator, an encoder, an amplifier, a transmission filter, and a modulator. The transmission circuit 31 allows the carrier oscillator to output a carrier wave. The encoder is connected to the control unit 21 to encode the transmission data outputted from the control unit 21 and to output the encoded data to the modulator. The modulator receives an input of the carrier wave from the carrier oscillator and the transmission data from the encoder. For the carrier wave outputted from the carrier oscillator, the modulator generates a signal which has been ASK (amplitude shift keying) modulated based on an encoded transmission code (modulation code), and outputs the modulated signal to the amplifier. In this case, the encoded transmission code is outputted from the encoder when transmitting a command to a communication target.

The amplifier amplifies the inputted signal (modulated by the modulator) with a predetermined gain and outputs the amplified signal to the transmission filter. The transmission filter filters the amplified signal from the amplifier, and outputs the filtered transmission signal to the antenna 34 via the matching circuit 33. When the transmission signal is outputted in this way to the antenna 34, the transmission signal is emitted to the outside by the antenna 34 as transmission waves.

A reply signal received by the antenna 34 is inputted to a reception circuit 32 via the matching circuit 33. The reception circuit includes a reception filter, an amplifier, a demodulator, a binarization processor, and a decoder. The reply signal received by the antenna 34 is filtered by the reception filter and amplified by the amplifier, and the amplified signal is demodulated by the demodulator. After that, the demodulated signal waves are binarized by the binarization processor, followed by decoding by the decoder. The decoded signal is then outputted as reception data to the control unit 21.

The antenna 34 is provided as a loop antenna which is formed of an antenna circuit board 60 on which a looped antenna pattern is formed. The antenna 34 is accommodated in the housing 11 in a state of being held by a holding member 70, which will be described later, and is arranged, as shown in FIG. 2, along the outer perimeter of the reading surface 12. Accordingly, in plan view of the reading surface 12, the reading port 13 and the display 24 are arranged on the inside of the antenna 34, while the mark K over which the contactless communication medium 100 is held is arranged near the center of the antenna 34 (see FIG. 2).

Figure 7:
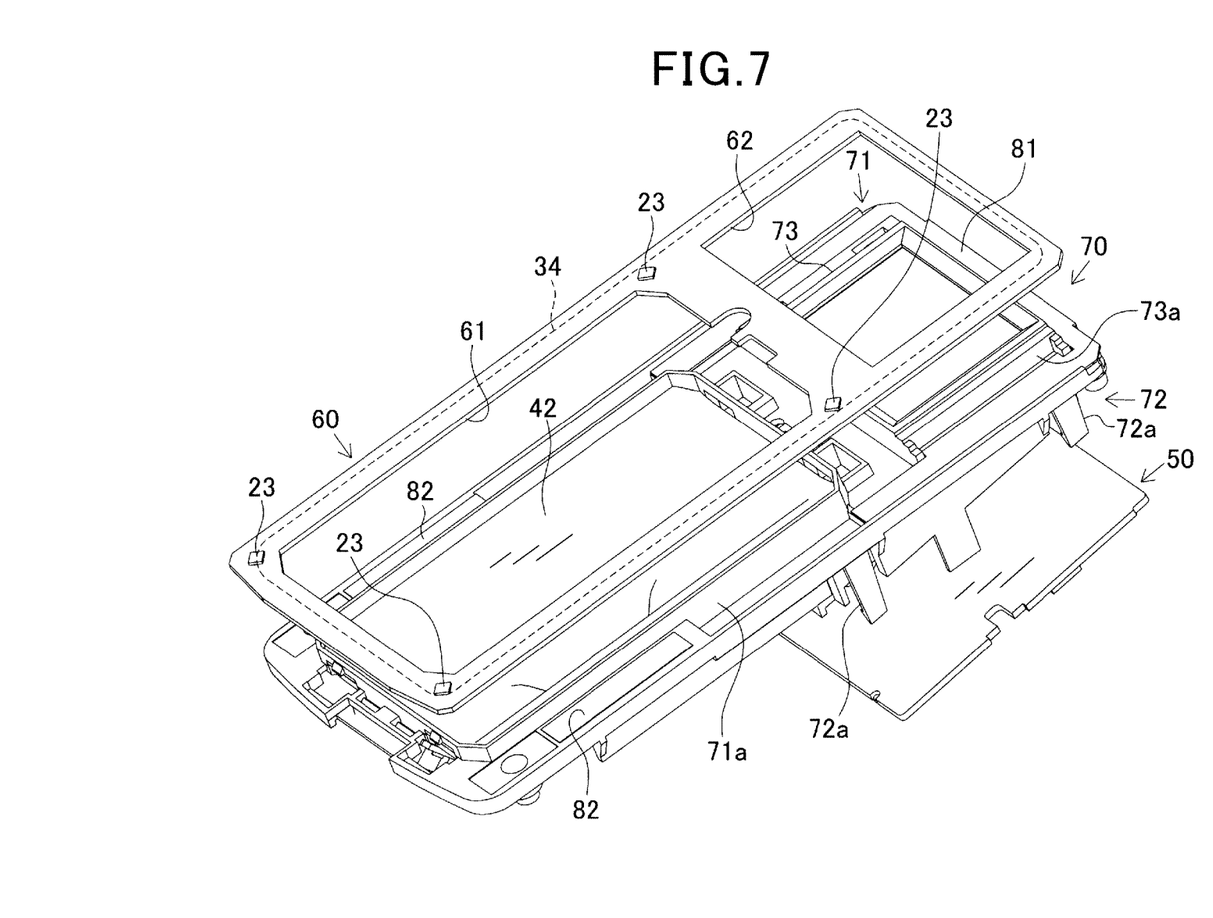
FIG. 7 is an exploded partial perspective view illustrating the information reading apparatus.

As shown in FIG. 7, the antenna circuit board 60 is formed with a first opening 61 and a second opening 62, with the looped antenna pattern of the antenna 34 being arranged along the outer perimeter of the antenna circuit board 60. The first opening 61 is in a rectangular shape and open enclosing the reading port 13. The second opening 62 is in a rectangular shape and open enclosing the display 24 and the display screen. The LEDs 23 are mounted to the antenna circuit board 60 so as to be located at positions corresponding to the four corners of the first opening 61. In FIG. 7, the antenna 34 is indicated by the dotted line for the sake of convenience.

Figure 6:
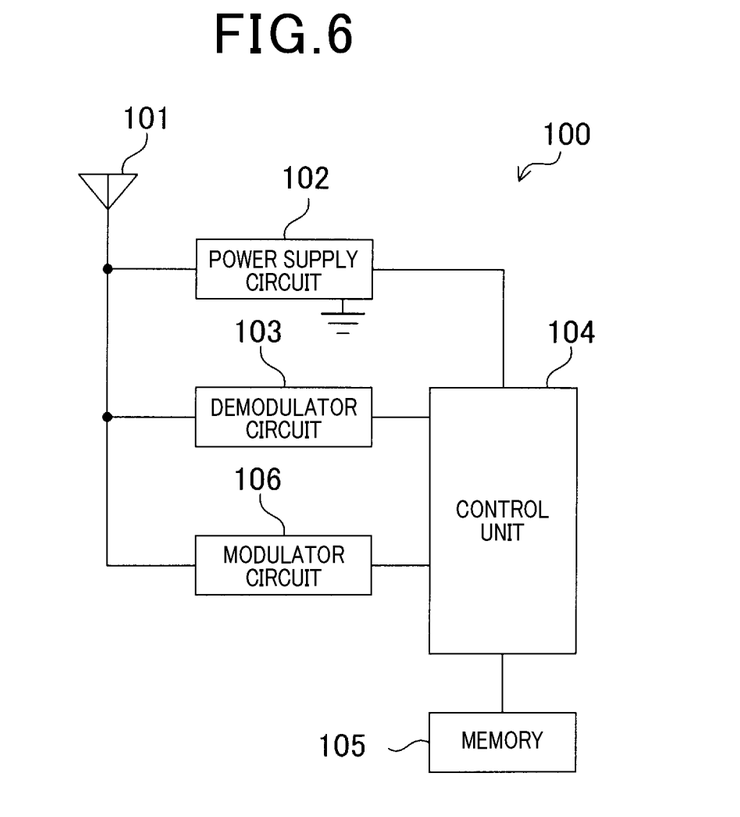
FIG. 6 is a schematic block diagram illustrating an electrical configuration of a contactless communication medium.

Referring now to FIG. 6, an electrical configuration of the contactless communication medium 100 will be described. As shown in FIG. 6, the contactless communication medium 100 includes an antenna 101, a power supply circuit 102, a demodulator circuit 103, a control unit 104, a memory 105, and a modulator circuit 106. The power supply circuit 102 rectifies and smooths the transmission signal (carrier signal) received from the information reading apparatus 10 via the antenna 101 to generate an activating supply power, and supplies the activating supply power to the individual components including the control unit 104.

The demodulator 103 demodulates the data superposed on the transmission signal (carrier signal) and outputs the demodulated data to the control unit 104. The memory 105 includes various semiconductor memories, such as ROM (read only memory) and EEPROM (electronically erasable and programmable read only memory), to store predetermined control programs and data according to the usage of the contactless communication medium 100.

For example, the memory 105 stores payment-related information (electronic money information), including the ID (identification data) and the balance of the electronic money. The control unit 104 reads the above information or data from the memory 105 for output to the modulator circuit 106 as transmission data. The modulator circuit 106 load-modulates the reply signal (carrier signal) with the transmission data and transmits the load-modulated signal through the antenna 101 as a reflected wave.

Figure 5C:
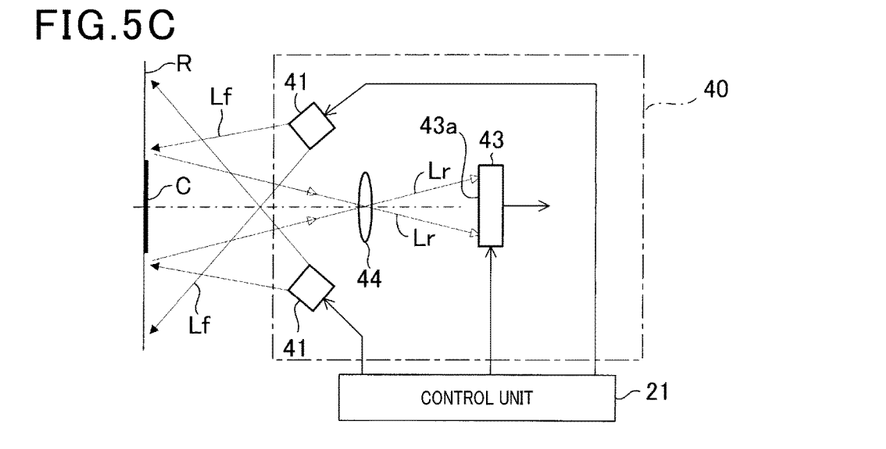
FIG. 5C is a schematic block diagram illustrating an information reading section illustrated in FIG. 5A.

Referring to FIGS. 2 and 5C, the information reading section 40 will be described. The information reading section 40 cooperates with the control unit 21 to capture an image of the information code, textual information, or the like. Specifically, the information reading section 40 uses a known decoding method or a symbol recognition processing function (i.e. optical character recognition (OCR)) to serve as an optical system for optically reading the information, and is provided with a projection optical system and a reception optical system.

The projection optical system includes an illumination light source 41 (hereinafter may also be simply referred to as light source 41) that serves as a light source capable of illuminating light, and is made up of projection elements, such as LEDs. As shown in FIG. 2, the light source 41 includes four projection elements, i.e. first light sources 41a and 41b arranged on the rear side (upper part of FIG. 2) of the reading port 13, and second light sources 41c and 41d arranged on the front side (lower part of FIG. 2) of the reading port 13.

As shown in FIG. 2, the projection optical system includes a light guide member 42 that guides light from the light source 41, and also includes an imager 43, an image forming member 44 (see FIG. 5C) and a reflective member 45. In the housing 11, the light guide member 42 is located such that the illumination light from the light source 41 is applied thereto. Specifically, the light guide member 42 is configured to guide the illumination light from the light source 41 so as to be radiated to the outside of the housing 11 via the opening of the reading port 13.

As shown in FIG. 2, the light guide member 42 includes a plurality of reflectors 42a, 42b, 42c and 42d that reflect the illumination light from the light source 41. These reflectors 42a, 42b, 42c and 42d all include their respective reflecting surfaces that reflect the illumination light from the light source 41. The reflecting surfaces of the reflectors 42a, 42b, 42c and 42d are all ensured to be inclined downward toward the center of the opening of the reading port 13.

For example, the reflectors 42a, 42b, 42c and 42d are each formed of a light-shielding member, with their reflecting surfaces being provided with respective predetermined colors (e.g., light colors, such as white), to diffuse and reflect light incident on the reflecting surfaces.

As shown in FIG. 2, the reflectors 42a and 42b are arranged face-to-face in the longitudinal direction. The reflectors 42c and 42d are arranged face-to-face in the direction (width direction) perpendicular to the longitudinal direction and have inclined surfaces that are inclined downward as these reflectors approach each other. On the outside of the field of view of the imager 43 (see FIG. 5C), the light guide member 42 in its entirety has a bowl shape in which the size of the hole (opening) becomes smaller with the downward inclination of the light guide member 42.

The first light sources 41a and 41b are arranged such that the illumination light is emitted from near the upper end of the reflector 42a of the light guide member 42 toward the reflector 42b, 42c or 42d. The second light sources 41c and 41d are arranged such that the illumination light is emitted from near the upper end of the reflector 42b of the light guide member 42 toward the reflector 42a, 42c or 42d.

With this configuration, the illumination light emitted from the light source 41 (41a to 41d) is applied to the wall surfaces of the bowl-shaped light guide member 42 to thereby allow the reflectors 42a, 42b, 42c and 42d to shine brightly in their entirety. It should be noted that FIG. 5C omits the light guide member 42 for the sake of convenience to show a state in which illumination light Lf from the light source 41 is emitted toward an information code C displayed on a reading target R.

The imager 43 (see FIG. 5C) configuring the reception optical system serves as the imaging means that optically captures an image such as of an information code or textual information. For example, the imager 43 is configured by a light-receiving sensor (areal sensor) in which solid-state image sensors (light-receiving elements), such as CCDs (charge-coupled devices) or CMOS (complementary metal-oxide semiconductor) devices, are two-dimensionally arrayed. As shown in FIG. 5C, the imager 43 has a light-receiving surface 43a on a side facing the image forming member 44 to receive light from outside the housing 11.

Specifically, the imager 44 is mounted to the board to receive the light incident on the light-receiving surface 43a through the image forming member 44.

The image forming member 44 is configured by a known image forming lens to serve as an image forming optical system. The image forming member 44 determines a field of view that can be imaged by the imager 43, and is configured to guide the light entering from outside the housing 11 through the reading port 13 (specifically, the light that is a reflection of the incident light reflected from the reflective member 45) to a light-receiving region of the imager 43. When information to be read optically is placed in the field of view on the outside of the housing 11, the image forming member 44 forms an image of the information in the light-receiving region of the imager 43.

In the present configuration, the illumination light is emitted from the light source 41 and guided by the light guide member 42 to the outside of the housing 11. With the guided illumination light being applied to information to be read optically, an image of the information is ensured to be captured in the present configuration. When information to be read optically is placed in the field of view (imaging area), the image forming member 44 collects reflection Lr from the information and forms an image of the information on the light-receiving surface 43a of the imager 43. Examples of the image forming member 44 that can be favorably used include wide-angle lenses with a short focal length and a wide angle of view.

The reflective member 45, which forms a part of the light guide member 42, is provided as a mirror that reflects the light entering from outside the housing 11 through the reading port 13 toward the image forming member 44. The reflective member 45 is arranged facing the image forming member 44, with its reflecting surface being inclined in conformity with part of the bowl-shaped light guide member 42.

Figure 8:
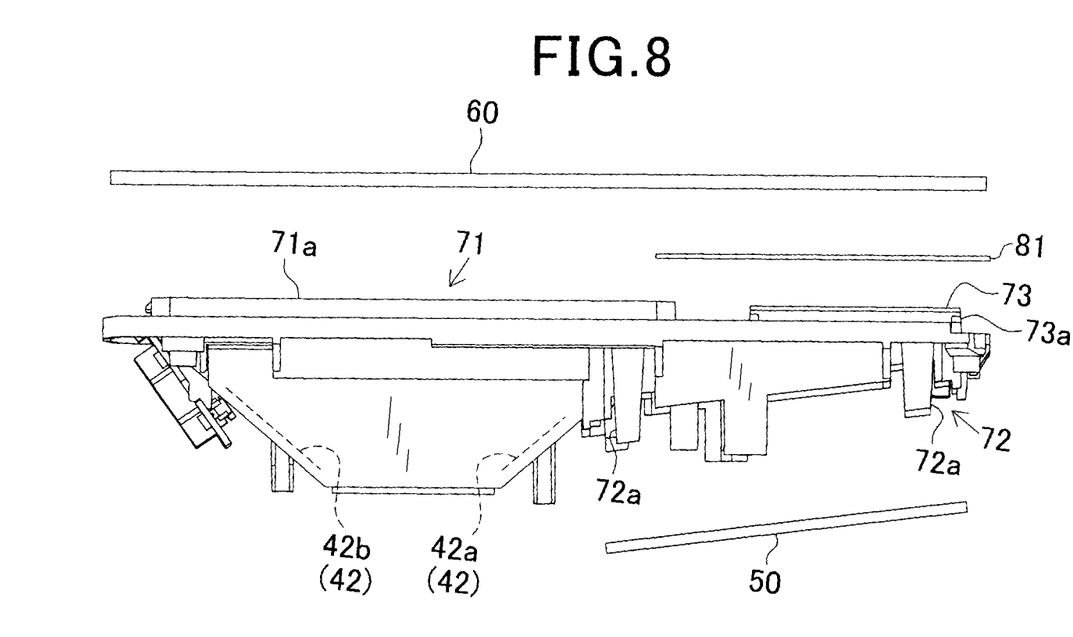
FIG. 8 is an exploded side view of the information reading apparatus illustrated in FIG. 7.
Figure 9:
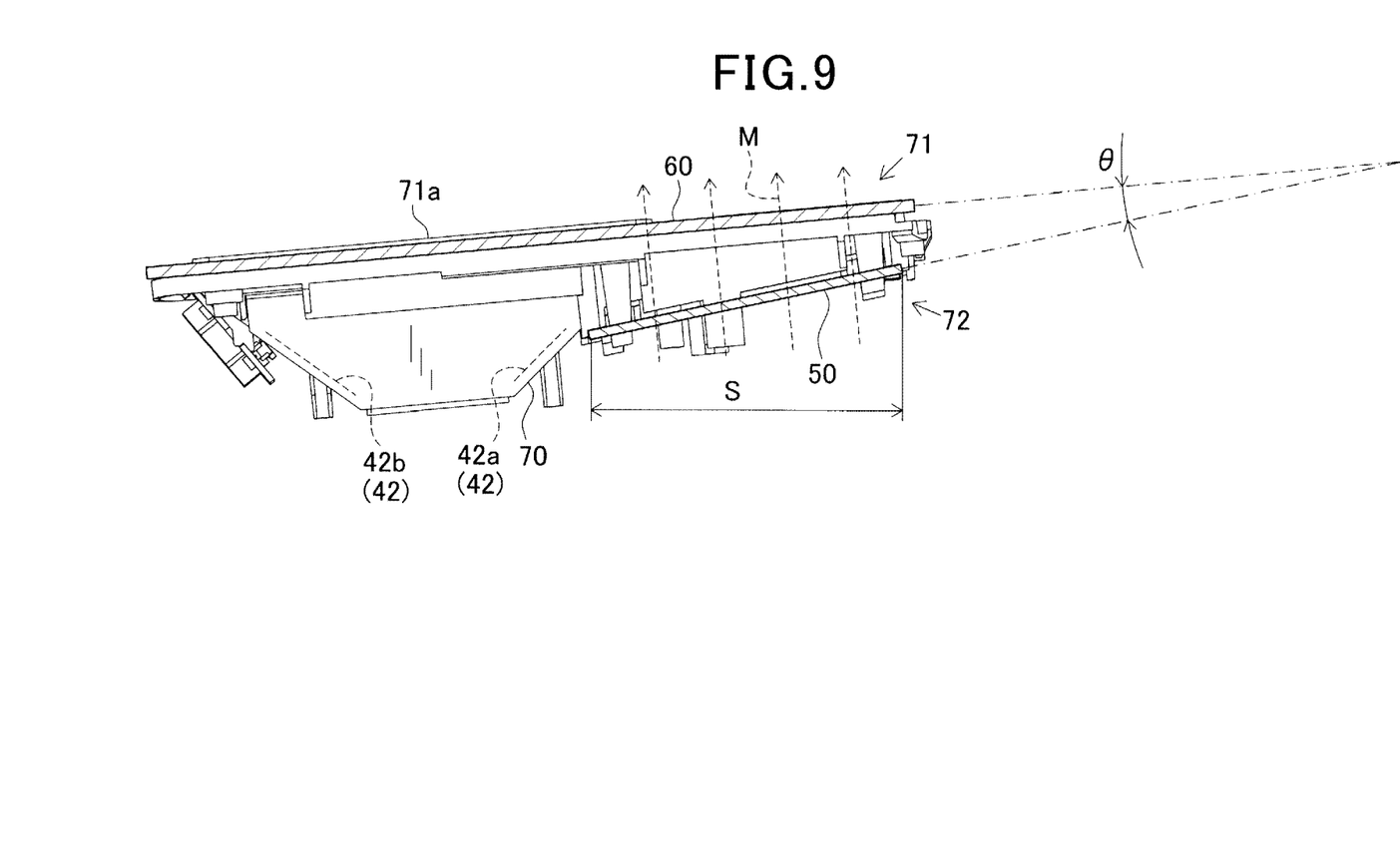
FIG. 9 is a diagram illustrating a positional relationship between a control circuit board and an antenna circuit board held by a holding member.

Referring to FIGS. 7 to 9, the following description sets forth the holding member 70 that holds the control circuit board 50 or the antenna circuit board 60 in the housing 11. FIGS. 7 to 9 schematically show the control circuit board 50, the antenna circuit board 60 and the like, omitting part of electronic parts and the like mounted to the circuit boards.

The holding member 70, which also holds other components, such as the display 24, in the housing 11 in addition to the control circuit board 50 and the antenna circuit board 60, is made of a synthetic resin, such as ABS resin (acrylonitrile-butadiene-styrene resin), that contains a magnetic material, such as ferrite. The holding member 70 is provided on its upper side with a first holder part 71 that holds the antenna circuit board 60, and a second holder part 72 on its lower side that holds the control circuit board 50. The light guide member 42 and the reflective member 45 described above are formed in a location corresponding to the front side (lower-left part of FIG. 7) of the housing 11, while a screen holder part 73 is provided in a location corresponding to the rear side (upper-right part of FIG. 7) of the housing 11 to hold the screen of the display 24.

The first holder part 71 is formed such that the antenna circuit board 60 is held in a state in which a rib 71a annularly extended from the upper end of the light guide member 42 is inserted to or engaged with the first opening 61 of the antenna circuit board 60, and a rib 73a configuring the screen holder part 73 is inserted to or engaged with the second opening 62. Therefore, in plan view of the reading surface 12, the reading port 13 and the display 24 are arranged on the inside of the antenna 34 (see FIG. 2). It should be noted that, the antenna circuit board 60 may be held by the first holder part 71 by engagement using a small engagement member or the like, or by adhesion using an adhesive member, or by fastening using a fastening member, or the like.

In the present embodiment, in particular, a U-shaped sheet-like magnetic member 81 is affixed to the perimeter of the rib 73a by adhesion or the like, while a sheet-like magnetic member 82 is affixed by adhesion, for example, to outer lateral sides of the rib 71a in the width direction. Thus, the antenna circuit board 60 is held by the holding member 70 via the magnetic members 81 and 82. Specifically, the magnetic members 81 and 82 are interposed between the antenna 34 and the holding member 70. In FIG. 8, the magnetic member 82 is omitted.

The second holder part 72 has a lower surface provided with a plurality of small engagement members 72a, seats (not shown), and the like. The small engagement members 72a extend downward from near the screen holder part 73. The small engagement members 72a, the seats, and the like are used for holding the control circuit board 50 via the outer edge thereof to prevent the circuit board 50 from being displaced. In particular, as shown in FIG. 9, the second holder part 72 is formed such that the control circuit board 50 is held being inclined by an angle θ with respect to the antenna circuit board 60.

In the information reading apparatus 10 configured in this way, the display 24 is arranged on the inside of the antenna 34 without overlapping therewith. With this configuration, the magnetic flux generated in the antenna 34 during contactless communication is unlikely to be inducted into the display 24, compared to the configuration in which the display 24 is arranged overlapping with the antenna 34. Accordingly, the display 24 is unlikely to affect the contactless communication using the antenna 34.

Since the control circuit board 50 is inclined with respect to the antenna circuit board 60, the projected area of the control circuit board 50 on the antenna circuit board 60 is smaller than in the case where the control circuit board 60 is held parallel to the antenna circuit board 60. Accordingly, the area (see the reference symbol S of FIG. 9) serving as a passage of the magnetic flux (see the arrows M of FIG. 9) generated in the antenna 34 of the antenna circuit board 60 is reduced in the control circuit board 50, thereby minimizing the adverse effect on the control circuit board 50 by the magnetic flux generated in the antenna 34 during contactless communication.

As described above, in the information reading apparatus 10 of the present embodiment, the information stored in the contactless communication medium 100 held over the reading surface 12 is read by the contactless communication section 30 according to transmission/reception of the electromagnetic waves via the antenna 34. In plan view of the reading surface 12, the reading port 13 is arranged on the inside of the antenna 34, without allowing the display 24 to overlap the antenna 34.

With this configuration, the antenna 34 can be made larger in size. In addition to that, contactless communication performed by the contactless communication section 30 is easily affected by the display 24. Therefore, in spite of the configuration of including the display 24 for displaying the read information, in addition to the information reading section 40 and the contactless communication section 30, contactless communication is stably performed with the contactless communication medium 100.

In plan view of the reading surface 12, the display 24 is arranged on the inside of the antenna 34. Accordingly, contactless communication is prevented from being affected by the display 24, and the size of the antenna 34 can be increased, thereby improving the communication performance associated with contactless communication.

Figure 10:
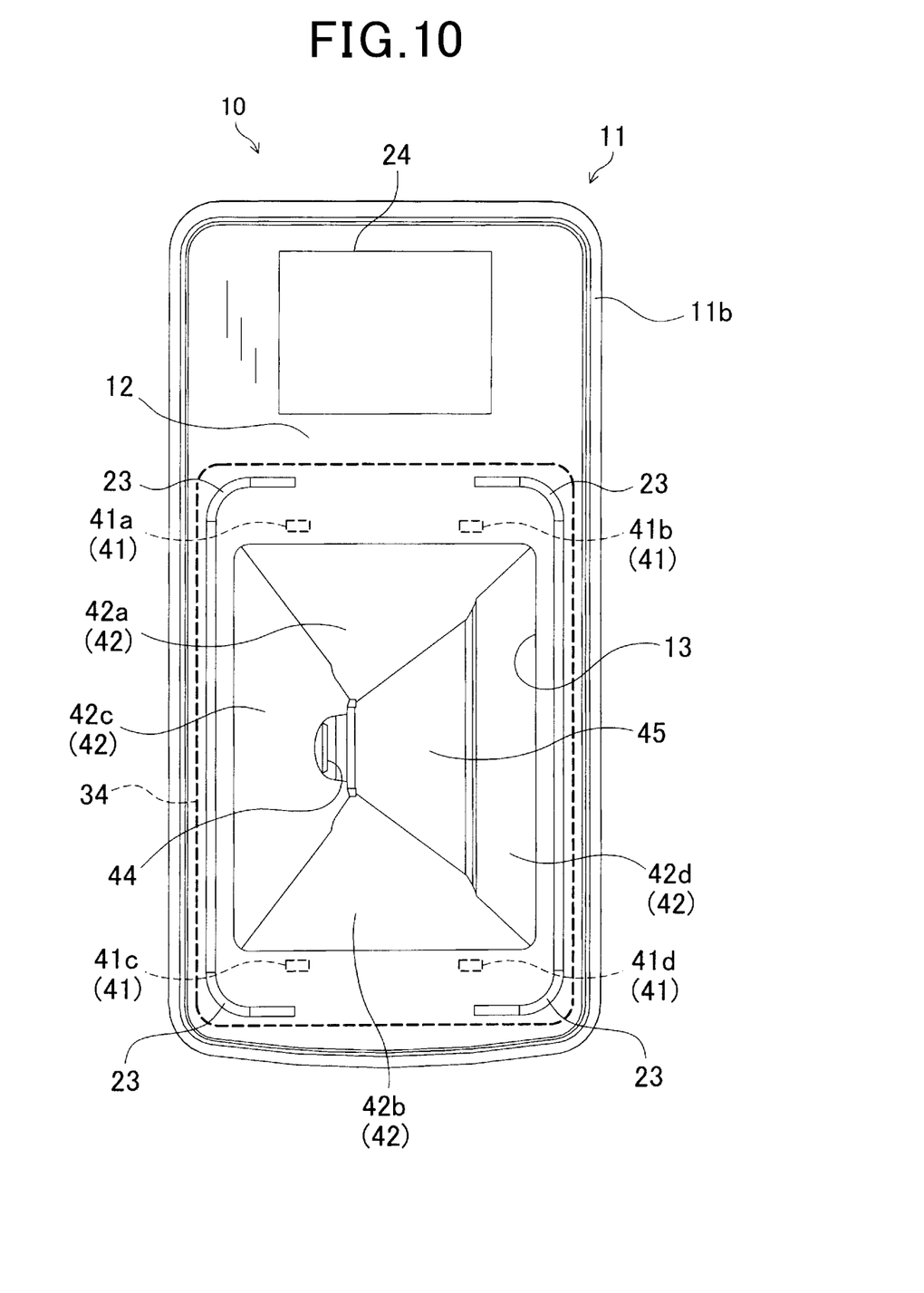
FIG. 10 is a plan view illustrating an information reading apparatus, according to a first modification of the first embodiment.

As in a first modification, shown in FIG. 10, of the first embodiment, the display 24 may be arrange on the outside of the antenna 34 in plan view of the reading surface 12 so as not to overlap the antenna 34, according to the requested communication performance or the like.

In the present embodiment, the single holding member 70 holds both the control circuit board 50 and the antenna circuit board 60. The control circuit board 50 is mounted with the control circuit performing at least part of the control associated with the information reading section 40 and the contactless communication section 30, while the antenna circuit board 60 is formed with the antenna pattern configuring the antenna 34. Thus, the control circuit board 50 is unlikely to be displaced relative to the antenna 34.

Since the holding member 70 is made of a synthetic resin that contains a magnetic material, magnetic permeability of the holding material 70 is enhanced. Accordingly, the magnetic flux generated during contactless communication is easily collected to the holding member 70 to thereby improve magnetic flux emission efficiency and improve the performance associated with contactless communication.

The material for forming the holding member 70 is not limited to the synthetic resin or the like that contains ferrite, but may be, for example, a synthetic resin or the like that contains different magnetic materials, according to the requested communication performance or the like. Moreover, the holding member 70 may be made of a metallic material, or may be made of a resin material without containing a magnetic material, according to the desired communication performance or the like.

In the present embodiment, the sheet-like magnetic members 81 and 82 are arranged between the antenna circuit board 60 and the holding member 70. Accordingly, the magnetic flux generated during contactless communication is easily collected to the magnetic members 81 and 82 to thereby improve magnetic flux emission efficiency and improve the performance associated with contactless communication.

Magnetic members, such as the magnetic members 81 and 82, may be arranged between the control circuit board 50 and the holding member 70, or may be arranged between the antenna circuit board 60 and the holding member 70 and between the control circuit board 50 and the holding member 70. Magnetic members may be annularly formed along the antenna 34 for arrangement with respect to the holding member 70, or may be formed along part of the antenna 34 for arrangement with respect to the holding member 70.

Being formed into a sheet-like shape, the magnetic members 81 and 82 are easily assembled to the holding member 70 or the like, improving workability associated with the assembly of the magnetic members 81 and 82.

The shape of magnetic members, such as the magnetic members 81 and 82 or the like, is not limited to a sheet-like shape, but may, for example, be a plate-like shape having a predetermined thickness.

In the present embodiment, the control circuit board 50 is held by the holding member 70 so as to be inclined with respect to the antenna circuit board 60. With this configuration, the area serving as a passage of the magnetic flux generated in the antenna 34 is reduced in the control circuit board 50, compared to the case where the control circuit board 50 is held parallel to the antenna circuit board 60. Thus, even when the control circuit boar 50 is affected by the magnetic flux generated in the antenna 34 during contactless communication, the adverse effect can be minimized.

Depending on the requested communication performance, the control circuit board 50 may be held parallel to the antenna circuit board 60 by the holding member 70.

In the present embodiment, the reading surface 12 is provided with the mark T on the inside of the antenna 34 in plan view of the reading surface 12 to indicate the position over which the contactless communication medium 100 is held. Therefore, the contactless communication medium 100 can be easily held at a position suitable for the antenna 34, thereby enabling reliable contactless communication with the contactless communication medium 100.

The reading surface 12 is provided with the LEDs 23 whose emission states change in conformity with the reading results of the information reading section 40 and the reading results of the contactless communication section 30. Accordingly, the reading results of these sections can be easily visually recognized.

Figure 11:
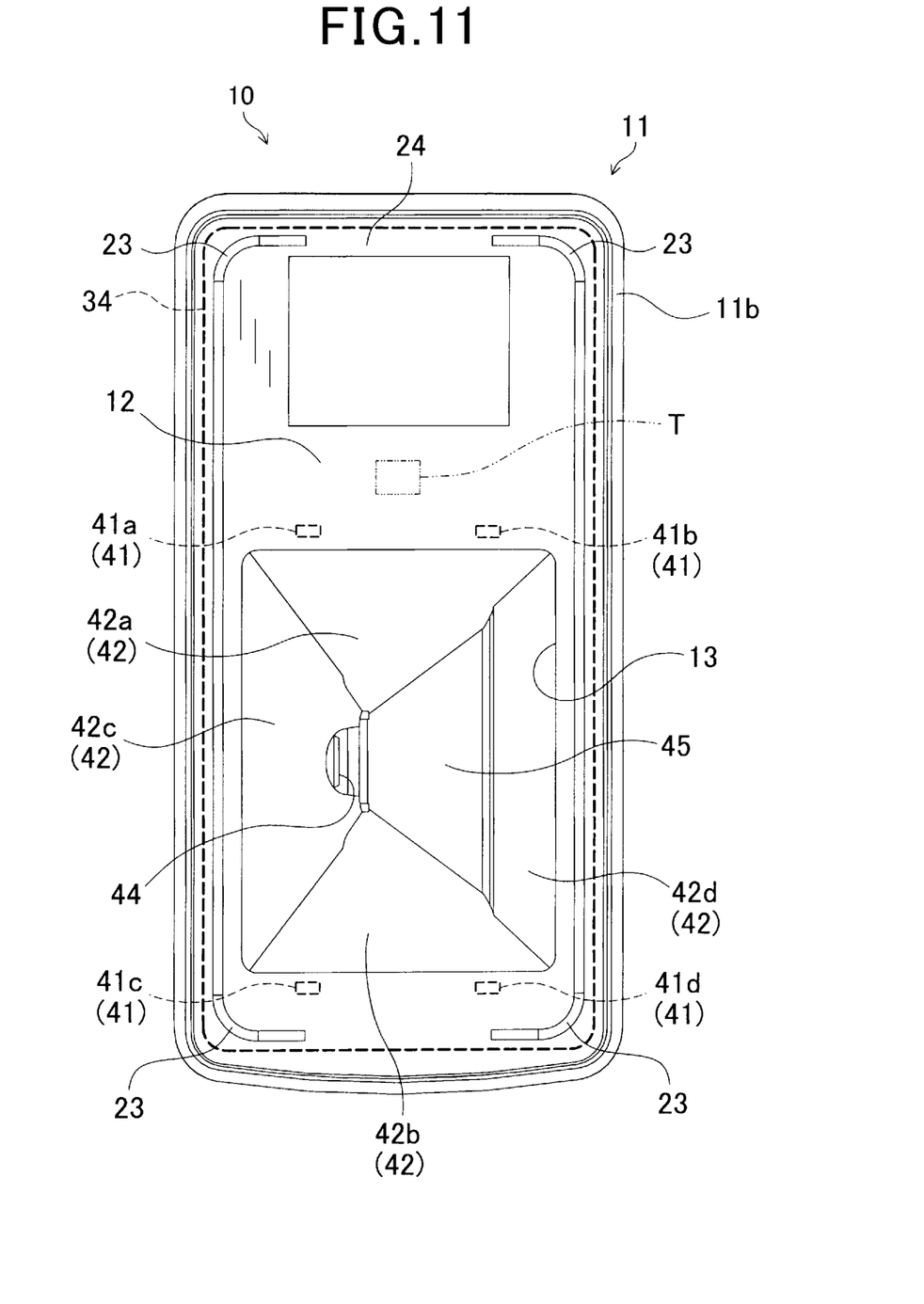
FIG. 11 is a plan view illustrating an information reading apparatus, according to a second modification of the first embodiment.

The LEDs 23 do not necessarily have to be arranged at the four corners of the rectangular region enclosing the reading port 13, but may be arranged, as shown in FIG. 11, at the four corners of the reading surface 12. This arrangement of the LEDs 23 clarifies the location of the reading surface 12 over which the contactless communication medium 100 should be held. Therefore, the contactless communication medium 100 can be easily held at a position suitable for the antenna 34 to thereby ensure reliable contactless communication with the contactless communication medium 100.

The advantageous effects described above can be achieved by arranging at least part of the LEDs 23 at diagonal corners of the reading surface 12.

The present invention should not be construed as being limited to the above embodiments but may be embodied as shown in the examples below.

(1) Application of the present invention is not limited to the information reading apparatus 10 in which the housing 11 is formed such that the reading surface 12 is inclined with respect to the mounting surface. The present invention may be applied to an information reading apparatus in which the housing is formed such that the reading surface 12 is parallel to the mounting surface.

(2) Application of the present invention is not limited to the information reading apparatus 10 configured as a stationary payment terminal. For example, the present invention may be applied to any information reading apparatus provided with an information reading means, a contactless communication means and a display means, including an information processing terminal that performs processing according to the read information and displays the processing results.

(3) In the present invention, the loop antenna is formed being provided with one or more annular loops. However, the present invention may include those antennas having a shape of U, C, Ω, or the like.

What is claimed is:

1. An information reading apparatus comprising:
   a housing having an upper face portion which is seen by a user who uses the information reading apparatus, the upper face portion being light-transmissive, the upper face portion providing a reading surface;
   an optical information reading means for optically reading information imaged through a reading port, the reading port being provided in the housing so as to be under the upper face portion;
   a contactless communication means for reading information stored in a contactless communication medium held over the reading surface by the user when the user uses the information reading apparatus, the information being read through contactless communication according to transmission/reception of electromagnetic waves via a loop antenna, the loop antenna being arranged in the housing so as to be located under the upper face portion; and a display means having a screen which displays information according to reading results of the optical information reading means and reading results of the contactless communication means, the screen being located in the casing and located under the upper face portion, wherein:

the reading port is arranged so as to be surrounded by the loop antenna when the upper face portion is viewed from above the upper face portion; and the screen of the display means is arranged not to overlap the loop antenna when the upper face portion is viewed from above the upper face portion.

2. The information reading apparatus according to claim 1, wherein the screen of the display means is arranged so as to be surrounded by the loop antenna when the upper face portion is viewed from above the upper face portion.

3. The information reading apparatus according to claim 1, further comprising:
a control circuit board that mounts thereon a control circuit that performs at least part of control associated with the optical information reading means and the contactless communication means;
an antenna circuit board that is formed with an antenna pattern configuring the loop antenna; and
a holding member that holds the control circuit board and the antenna board.

4. The information reading apparatus according to claim 3, wherein the holding member is made of a material that contains a magnetic material.

5. The information reading apparatus according to claim 3, wherein a magnetic member is arranged at least between the control circuit board and the holding member, or between the antenna circuit board and the holding member.

6. The information reading apparatus according to claim 5, wherein the magnetic member is formed into a sheet-like shape.

7. The information reading apparatus according to claim 3, wherein the control circuit board is held by the holding member so as to be inclined with respect to the antenna circuit board.

8. The information reading apparatus according to claim 1, wherein the reading surface is provided with a mark over which the contactless communication medium is held by the user, the mark being positioned so as to be surrounded by the loop antenna when the upper face portion is viewed from above the upper face portion.

9. The information reading apparatus according to claim 1, wherein the reading surface is provided with one or more light-emitting portions whose emission state change according to reading results of the optical information reading means and reading results of the contactless communication means.

10. The information reading apparatus according to claim 9, wherein at least part of the plurality of the light-emitting portions are arranged at diagonal corners of the reading surface.

11. The information reading apparatus according to claim 2, further comprising:
a control circuit board that mounts thereon a control circuit that performs at least part of control associated with the information reading means and the contactless communication means;
an antenna circuit board that is formed with an antenna pattern configuring the loop antenna; and
a holding member that holds the control circuit board and the antenna board.

12. The information reading apparatus according to claim 11 wherein the holding member is made of a material that contains a magnetic material.

13. The information reading apparatus according to claim 12, wherein a magnetic member is arranged at least between the control circuit board and the holding member, or between the antenna circuit board and the holding member.

14. The information reading apparatus according to claim 12, wherein the magnetic member is formed into a sheet-like shape.

15. The information reading apparatus according to claim 11, wherein the control circuit board is held by the holding member so as to be inclined with respect to the antenna circuit board.

16. The information reading apparatus according to claim 11, wherein the reading surface is provided with a mark over which the contactless communication medium is held, the mark being positioned on the inside of the loop antenna in plan view of the reading surface.

17. The information reading apparatus according to claim 11, wherein the reading surface is provided with one or more light-emitting portions whose emission state change according to reading results of the information reading means and reading results of the contactless communication means.

18. The information reading apparatus according to claim 17, wherein at least part of the plurality of the light-emitting portions are arranged at diagonal corners of the reading surface.

19. The information reading apparatus according to claim 2, wherein the reading port and the screen of the display means are located to be neighbored with each other and to be surrounded by the loop antenna when the upper face portion is viewed from above the upper face portion.

20. The information reading apparatus according to claim 8, wherein the reading port and the screen of the display means are located to be neighbored with each other and to be surrounded by the loop antenna and the mark is present between the reading port and the screen of the display means when the upper face portion is viewed from above the upper face portion.

21. The information reading apparatus according to claim 1, wherein the housing has an upper case and a lower case provided to be opposed to the upper case, the upper case providing the upper case portion, the lower case being placed on a user's desired place when the information reading apparatus is used as a stationary information reading apparatus.

22. The information reading apparatus according to claim 1, wherein the reading surface, the reading port, and the screen of the display means are provided to substantially occupy an upper and same side face of the housing.

* * * * *